United States Patent
Hattori

(10) Patent No.: US 8,102,575 B2
(45) Date of Patent: Jan. 24, 2012

(54) IMAGE PROCESSING APPARATUS AND METHOD

(75) Inventor: Yusuke Hattori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 801 days.

(21) Appl. No.: 11/781,708

(22) Filed: Jul. 23, 2007

(65) Prior Publication Data

US 2008/0024841 A1   Jan. 31, 2008

(30) Foreign Application Priority Data

Jul. 28, 2006   (JP) .................................. 2006-205945

(51) Int. Cl.
  *H04N 1/40* (2006.01)
  *H04N 1/04* (2006.01)
  *G03G 15/00* (2006.01)
(52) U.S. Cl. ........ 358/449; 358/474; 399/370; 399/371; 399/376
(58) Field of Classification Search .................. 358/449
  See application file for complete search history.

(56) References Cited

U.S. PATENT DOCUMENTS

| 5,068,913 | A | * | 11/1991 | Sugiura ........................ 382/175 |
| 5,724,447 | A | * | 3/1998 | Fukushima ................... 382/211 |
| 6,433,896 | B1 | * | 8/2002 | Ueda et al. .................... 358/488 |
| 2005/0191100 | A1 | * | 9/2005 | Ooshima et al. ............. 399/370 |

FOREIGN PATENT DOCUMENTS

| JP | 2001-268367 A | 9/2001 |
| JP | 2004-096435 A | 3/2004 |

* cited by examiner

*Primary Examiner* — Benny Tieu
*Assistant Examiner* — Fan Zhang
(74) *Attorney, Agent, or Firm* — Canon USA, Inc., I.P. Division

(57) ABSTRACT

In a method for reading a document set on a document positioning plate to output image data, an edge area of an image of an entire reading area is extracted to form a first rectangle area including the extracted edge area. If a position of an apex of the first rectangle area farthest from a reading reference position and a size of the first rectangle area satisfy predetermined conditions, image data corresponding to a second rectangle area including the first rectangle area and the reading reference position are output.

8 Claims, 5 Drawing Sheets

FIG.3A                  FIG.3B
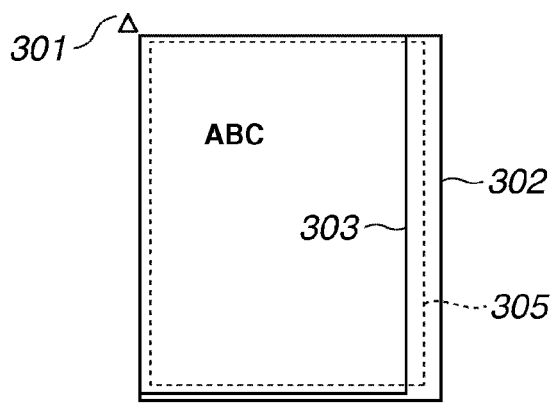
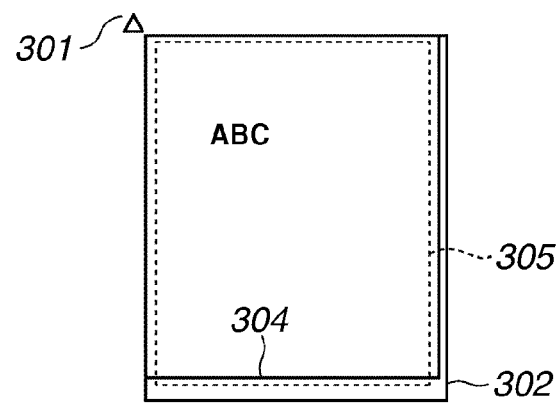

EDGE EXTRACTION PROCESS

DOCUMENT AREA ESTIMATION PROCESS

DOCUMENT AREA CORRECTION PROCESS

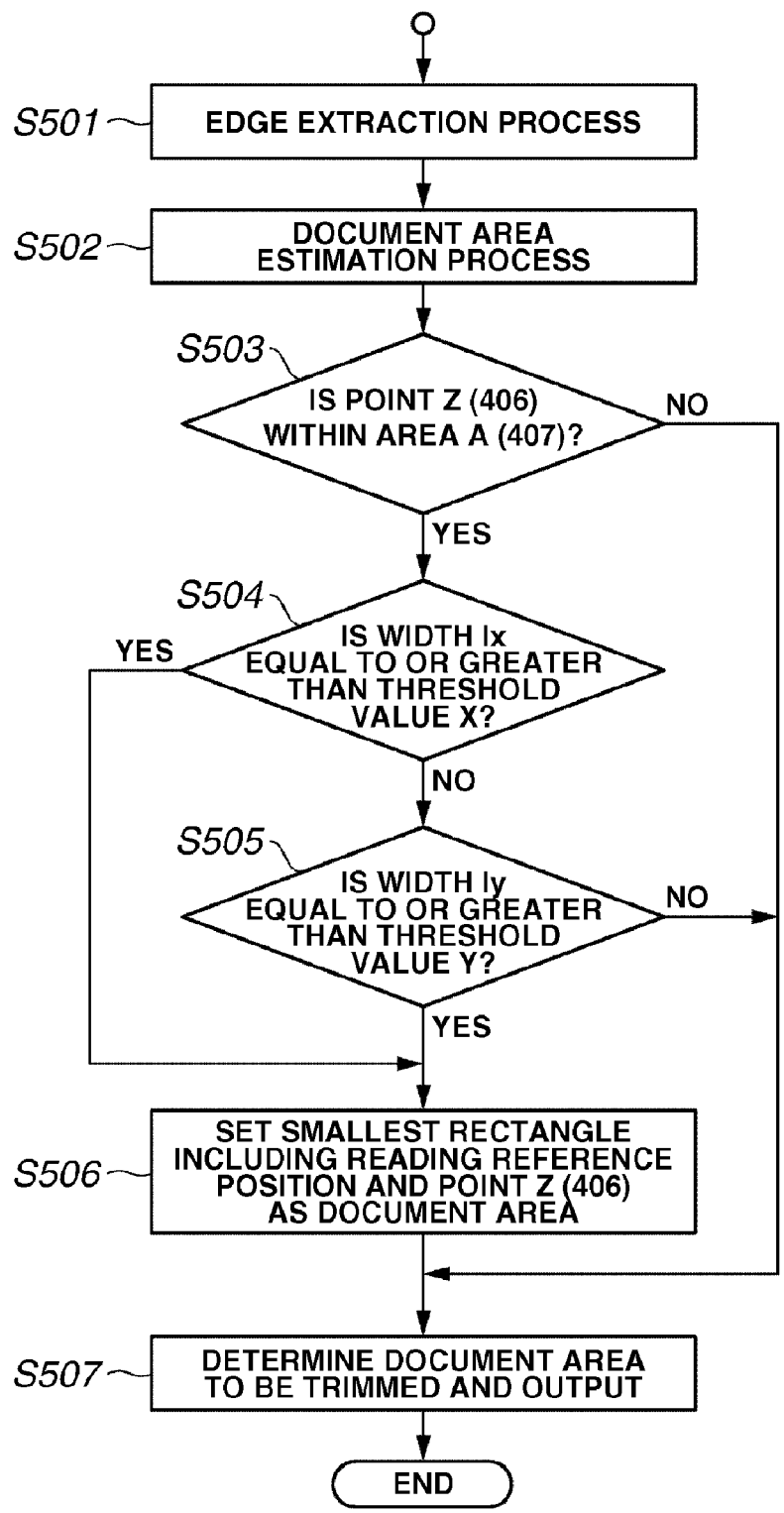

IMAGE PROCESSING APPARATUS AND METHOD

BACKGROUND OF THE INVENTION

1. Field of the Invention

The present invention relates to an image processing apparatus for reading an image of a document set on a document positioning plate of an image reading apparatus and processing and outputting the read image, and more particularly to an image processing apparatus for outputting an image of a document area set on a document positioning plate.

2. Description of the Related Art

Image reading apparatuses for use in digitizing and inputting data on paper medium to personal computers (PCs) include an imaging scanner, a multifunctional peripheral, and the like. These image reading apparatuses are capable of reading various types of documents, such as a monochrome image of a text document, a color image of a magazine, a developed photograph, and a negative or positive film.

An image read by such an image reading apparatus corresponds to an image on the entire document positioning plate and can include an image other than an image of a document. As a function convenient for outputting an image, a function of automatically determining only a document area and outputting only an image of the document area can be used. When a plurality of documents is set on the document positioning plate, a function of outputting a smallest rectangular area including images of all of the plurality of documents and a function of outputting each rectangular area including an image of each document can be selectively used.

In existing scanners, a reading start position thereof is not a reference position at an end of a document positioning plate, which is a position that a document abuts on, but a position slightly inside the document positioning plate, because of mechanical accuracy. This is for the purpose of preventing a part of an abutting portion from being scanned and read due to a mechanical assembling error. A margin of a front end of a document from the reference position in a vertical direction is referred to as a "front end registration". A margin of a left end of the document from the reference position in a horizontal direction is referred to as a "left end registration". The same applies to rear and right ends of the document. Thus, since less than the entire image on the document positioning plate can be read, when a document of a size close to the size of the document positioning plate is placed thereon and scanned, image information of some edges of the document may not be obtained.

In general, information of edges of the document is essential for an automatic document area trimming process. This automatic document area trimming process may fail if image information of all of the edges of the document is not obtained. Specifically, only an image part of the document may be trimmed, or an image of an end of the document may be omitted. For example, FIG. 3A illustrates a document 303 set on a document positioning plate 302 with a corner thereof adjusted to a reading reference position mark 301, as viewed from a reading surface. Only a slight difference exists in longitudinal length between the document 303 and the document positioning plate 302. Thus, a read image 305 is obtained in which image information of a bottom edge of the document 303 cannot be obtained due to an influence of front, rear, left, and right end registrations. When the read image 305 is subjected to edge extraction, an edge 402 is obtained as illustrated in FIG. 4B. In this case, an edge corresponding to the bottom edge of the document 303 cannot be obtained. Only the edge 402 and an edge of an image 403 inside the document 303 are obtained. A smallest rectangle 404 including the edge 402 is obtained as illustrated in FIG. 4C. If the rectangle 404 is subjected to trimming, an image of the left-hand portion of the document is omitted.

Japanese Patent Application Laid-Open No. 2001-268367 discusses a method for detecting and distinguishing a document area from another area by applying a pattern to a component of an image reading apparatus serving as a background of a read image. Japanese Patent Application Laid-Open No. 2004-096435 discusses a method for analyzing a pixel value distribution of a read image to specify an edge highly likely to be a document edge between a background and a document. However, the former method is costly because the apparatus itself must be processed. The latter method is inapplicable when no edge exists in the read image due to an influence of front and left end registrations.

SUMMARY OF THE INVENTION

An embodiment of the present invention is directed to facilitating accurate trimming of only a document area, or only a smallest rectangle including all of a plurality of document areas, even if all of edges of a document cannot be obtained due to an influence of front and left end registrations.

According to an aspect of the present invention, an embodiment is directed to a method for reading a document set on a document positioning plate to output image data. The method includes: reading the document through the document positioning plate to obtain image data; extracting an edge area of the image data; determining a first rectangle area including the extracted edge area; determining whether an apex of the first rectangle area located in a position farthest from a reading reference position is within a predetermined area; comparing a length of the first rectangle area in a main scanning direction with a predetermined main scanning length; comparing a length of the first rectangle area in a sub-scanning direction with a predetermined sub-scanning length; outputting, as a read image of the document, data corresponding to a second rectangle area including the first rectangle area and the reading reference position among the image data in a first case where it is determined that the apex is within the predetermined area and where it is determined that the length of the first rectangle area in the main scanning direction is equal to or greater than the predetermined main scanning length or where it is determined that the length of the first rectangle area in the sub-scanning direction is equal to or greater than the predetermined sub-scanning length; and outputting, as a read image of the document, data corresponding to the first rectangle area in a second case other than the first case.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B are diagrams illustrating examples of a document placed on a document positioning plate of the scanner according to an exemplary embodiment of the invention.

FIG. 5 is a flowchart illustrating an image processing process according to an exemplary embodiment of the invention.

DETAILED DESCRIPTION OF THE EMBODIMENTS

Various exemplary embodiments, features, and aspects of the invention will be described in detail below with reference to the drawings.

Figure 1:
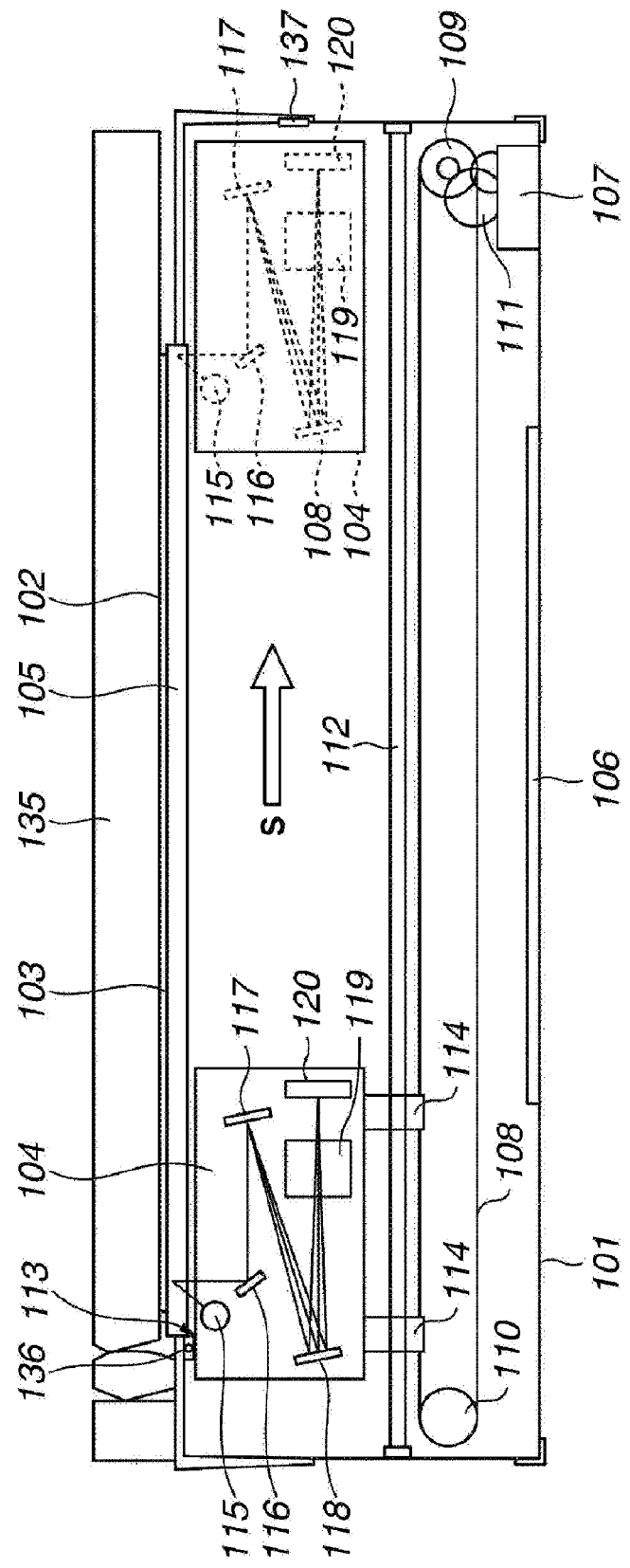
FIG. 1 is a sectional diagram illustrating an exemplary configuration of a scanner according to an exemplary embodiment of the present invention.

FIG. 1 is a sectional diagram illustrating an exemplary configuration of an image reading apparatus (scanner) for use with an image processing apparatus according to an exemplary embodiment of the present invention.

In FIG. 1, the scanner 101 includes a transparent document unit 102, in which a document 103 to be read (scanned) can be set. The scanner 101 is connected to a host computer (host PC) 221 (FIG. 2) via an interface cable (not shown).

The scanner 101 further includes a moving optical unit 104, a document positioning glass plate 105, an electric circuit board 106, a pulse motor 107, an endless belt 108, pulleys 109 and 110, a gear train 111, a guide rail 112, and a white reference plate 113. The white reference plate 113 has a black mark 136. The scanner 101 can determine a reading area based on the black mark 136 to read an image. The moving optical unit 104 and the pulse motor 107 are electrically connected to each other via a cable (not shown). The moving optical unit 104 is mounted on the guide rail 112 with a carriage 114 for sliding movement. The carriage 114 is fixed to the endless belt 108.

The moving optical unit 104 includes a reflective document light source 115, a plurality of reflection mirrors 116 to 118, an image forming lens 119, and a line sensor 120, which is an imaging unit.

An operation for reading a reflective document image with the scanner 101 configured in the aforementioned manner will be now described briefly.

The scanner 101 starts a reading operation in response to a reading command from the host PC 221. The scanner 101 turns on the reflective document light source 115 of the moving optical unit 104. Reflected light from the document 103 reflects at the plurality of mirrors 116 to 118 to form an image on the line sensor 120 via the image forming lens 119. The scanner 101 thus reads an image for one line in a main scanning direction. The scanner 101 then transmits a motive force of the pulse motor 107 to the pulley 109 via the gear train 111 to rotate the pulley 109, thus driving the endless belt 108. Accordingly, the moving optical unit 104 fixed to the endless belt 108 with the carriage 114 moves along the guide rail 112 in a sub-scanning direction, which is indicated by an arrow S. The scanner 101 repeats reading of line images in the main scanning direction while moving the moving optical unit 104 in the sub-scanning direction. The scanner 101 can scan an area corresponding to the entire surface of the document positioning glass plate 105 by moving the moving optical unit 104 up to a position indicated by a dotted line in FIG. 1 while executing the reading operation. A partial image of the document on the document positioning glass plate 105 can be read according to contents of a reading command from the host PC 221. In this case, the reading operation can be performed such that a control unit (described below) of the electric circuit board 106 defines a pixel range to be employed among sensor outputs in the main scanning direction and a moving range of the moving optical unit 104 in the sub-scanning direction with respect to a reading image range designated by the host PC 221.

Figure 2:
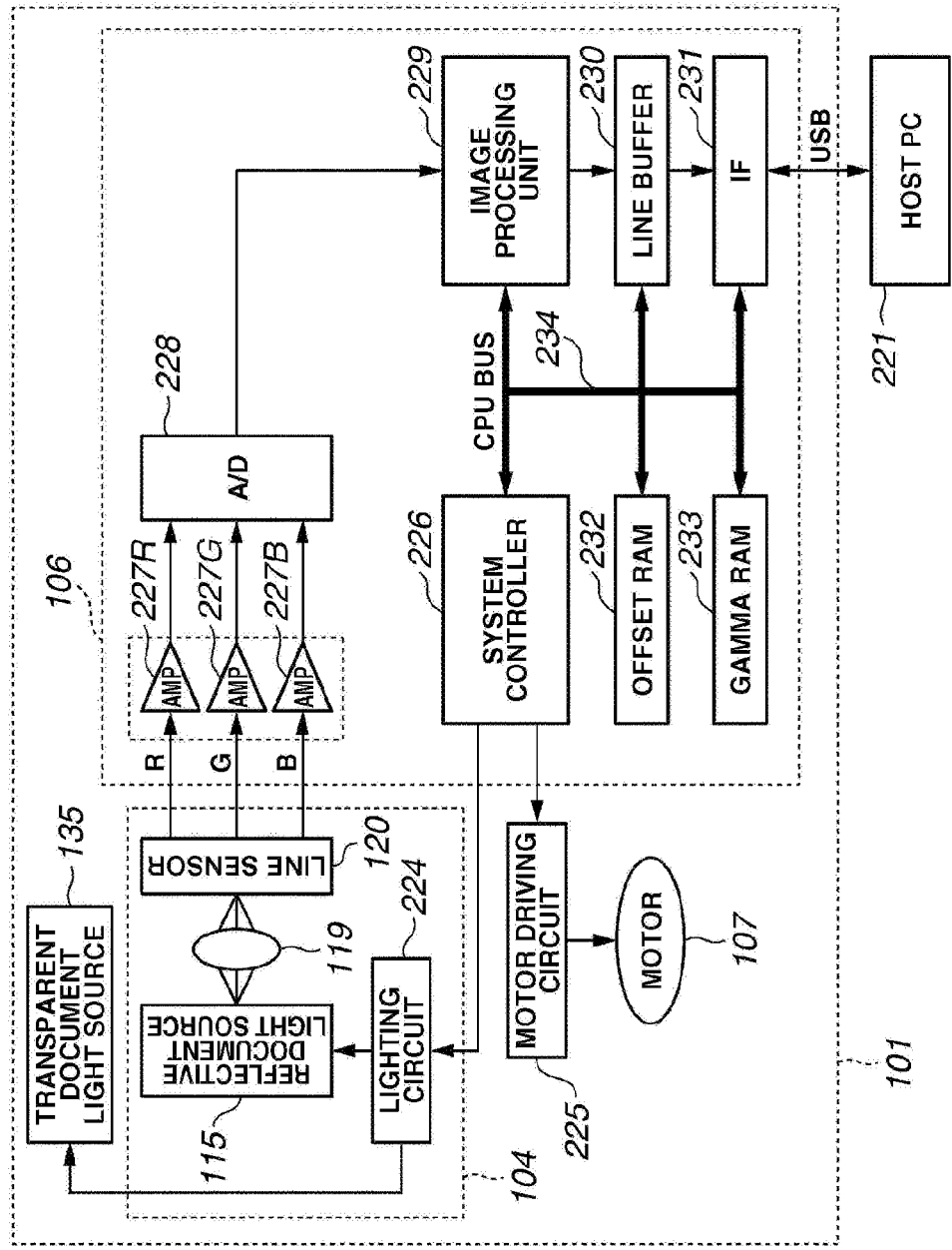
FIG. 2 is a block diagram illustrating a functional configuration of the scanner according to an exemplary embodiment of the invention.

FIG. 2 is a block diagram mainly illustrating a functional configuration of the scanner 101. Components similar to those of FIG. 1 are denoted by similar reference numerals.

The moving optical unit 104 includes a light source lighting circuit 224 for lighting the reflective document light source 115 and a transparent document light source 135. The light source lighting circuit 224 includes a detection unit for detecting a light quantity of each light source. The light source lighting circuit 224 acts as a so-called inverter circuit when cold-cathode tubes are used for the reflective document light source 115 and the transparent document light source 135.

In the electric circuit board 106, analog gain regulators 227R, 227G, and 227B can variably amplify analog image signals output from the line sensor 120. An A/D converter 228 converts analog image signals output from the variable analog gain regulators 227R, 227G, and 227B into a digital image signal. An image processing unit 229 performs image processing, such as offset correction, shading correction, digital gain adjustment, color balance adjustment, masking, resolution conversion in the main/sub-scanning direction, or image compression, on the digital image signal.

A line buffer 230 includes a general-purpose random access memory (RAM) to temporarily store image data. An interface (IF) unit 231 communicates with the host PC 221. The interface unit 231 includes an USB interface, but can include another interface, such as IEEE 1394d. An offset RAM 232 is used as a working area in image processing. The offset RAM 232 is used for correcting offset between RGB lines as RGB line sensors are arranged in parallel in the line sensor 120 with predetermined offset. The offset RAM 232 temporarily stores various data of shading correction and the like. The offset RAM 232 includes a general-purpose random access memory. A gamma RAM 233 stores a gamma curve to execute gamma correction.

A system controller 226 stores a control sequence for the scanner 101 and carries out various control operations according to a command from the host PC 221. A system bus 234 interconnects the system controller 226, the image processing unit 229, the line buffer 230, the interface unit 231, the offset RAM 232, and the gamma RAM 233, and includes an address bus and a data bus.

A motor driving circuit 225 outputs an excitation switching signal to the pulse motor 107 based on a signal from the system controller 226, which is a system control unit of the scanner 101.

An operation according to an exemplary embodiment of the present invention will be described with reference to transmission diagrams of an automatic document area estimation process illustrated in FIGS. 4A to 4E and a flowchart illustrated in FIG. 5.

First, a document to be scanned is placed on a document positioning plate of a scanner as illustrated in FIG. 3A or 3B. FIG. 3A illustrates a case in which an A4-size document 303 is set on the document positioning plate 302 with a corner of the document 303 adjusted to a reading reference position mark 301. FIG. 3B illustrates a case in which a letter-size document 304 is set in a similar manner. Positions in vertical and horizontal directions will be indicated by coordinate positions with the corner used as a reference. For the sake of explanation, in an embodiment, it is presumed that a horizontal width of the document positioning plate 302 is 217 mm, and a vertical length thereof is 298 mm. The front end registration and the left end registration are set to 5 mm. The rear end registration and the right end registration are also set to 5 mm. Thus, the readable range is from 5 mm to 212 mm in a horizontal direction and from 5 mm to 293 mm in a vertical direction. The readable range is indicated with broken lines 305 in FIGS. 3A and 3B. Accordingly, when a corner of the document 303 or 304 is adjusted to the reading reference position mark 301, a bottom edge of the A4-size document 303 (210 mm×297 mm) is not within the readable range 305, and a right edge of the letter-size document 304 (215.9 mm×279.4 mm) is not within the readable range 305. In the A4-size document 303 (210 mm×297 mm) illustrated in FIG. 3A, a character "ABC" is printed in a position 50 mm horizontally and 50 mm vertically away from the upper left corner. In the letter-size document 304 (215.9 mm×279.4 mm) illustrated in FIG. 3B, a character "ABC" is printed in a position 50 mm horizontally and 50 mm vertically away from the upper left corner.

Figure 4A:
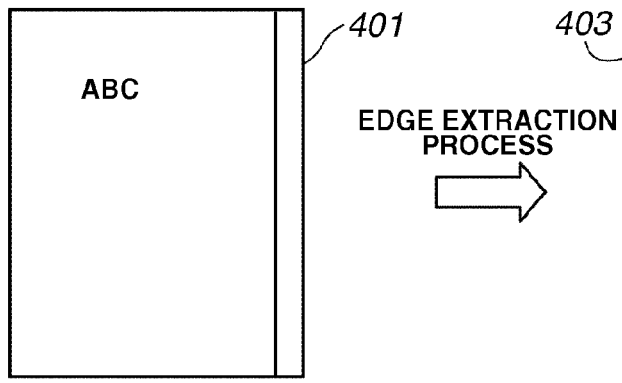
FIGS. 4A to 4E are transition diagrams illustrating a document area estimation process according to an exemplary embodiment of the invention.
Figure 4B:
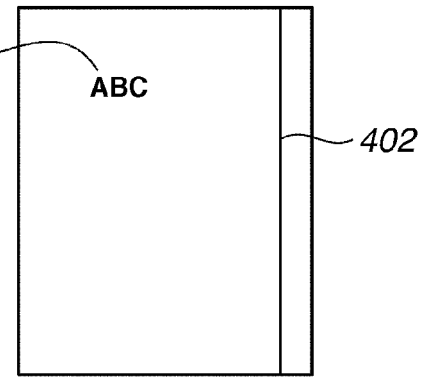
Figure 4C:
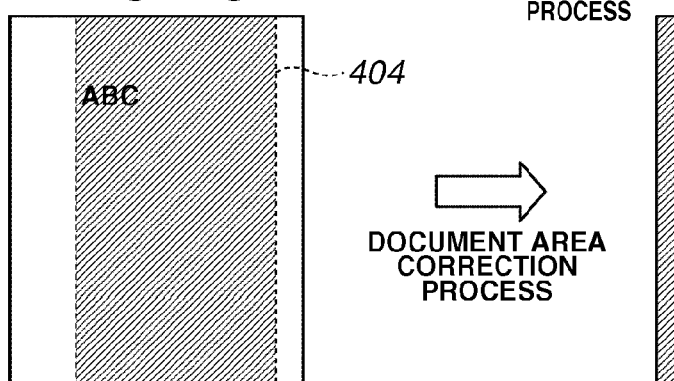
Figure 4D:
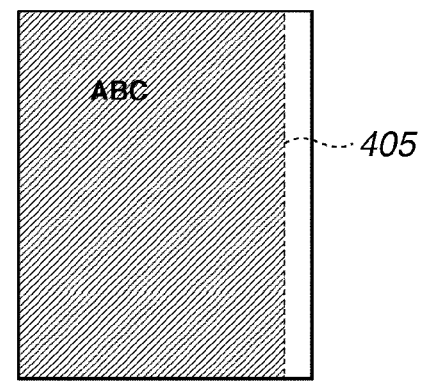
Figure 4E:
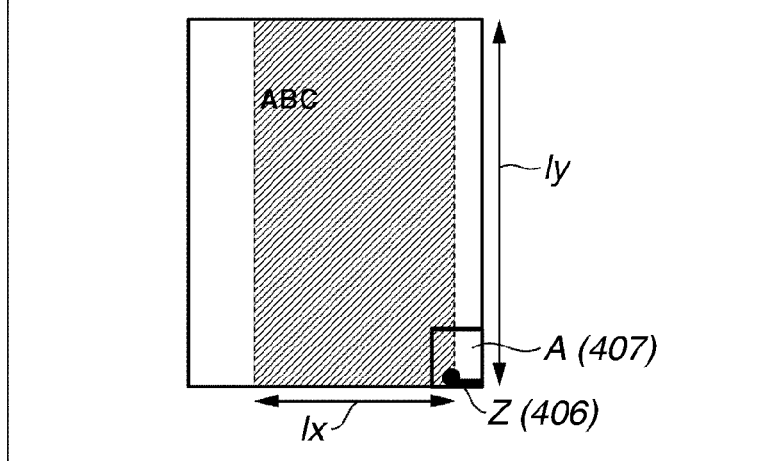

When an image is read in the state illustrated in FIG. 3A, a read image 401 illustrated in FIG. 4A is obtained. Although the document positioning plate 402 has a height of 298 mm, data can be read only within a height range of from 5 mm to 293 mm from the reading reference position mark 301 because of an influence of the front and rear end registrations. Thus, while a vertical length of the document 303 is 297 mm, a top edge of 5 mm and a bottom edge of 4 mm of the document 303 are not present in the read image 401.

A process carried out for the image information read with the aforementioned margins will be described below with reference to FIG. 5. In an edge extraction process S501 in FIG. 5, edge extraction is carried out with an 8-direction Laplacian filter and binarization. The 8-direction Laplacian filter multiplies 9 pixel values of upper, lower, left and right sides around a given target point by a coefficient "−8" for the target point and a coefficient "1" for the other points, and sums up the multiplication results. If the total value is larger than a binarization threshold value, the target point is extracted as an edge. When the edge extraction process S501 is carried out for the read image 401, an edge 402 indicating the right edge of the document and an edge 403 indicating a character image "ABC" in the document are obtained. The front end of the document exists in the range of 5 mm of the front end registration. The left end of the document exists in the range of 5 mm of the left end registration. The rear end of the document exists in the range of 4 mm of the rear end registration. Thus, there are no edges of the front end, rear end, and left end in the read image. Accordingly, the edges of the front end, rear end, and left end of the document are not extracted.

In a document area estimation process S502, a smallest rectangle including all of the edges obtained in step S501 is generated. A smallest rectangle 404 indicated with hatching in FIG. 4C includes the edges 402 and 403. The smallest rectangle 404 can be obtained by calculating minimum and maximum values in a horizontal direction and minimum and maximum values in a vertical direction among coordinates of all of the obtained edges. The obtained rectangle has four apexes indicated with a coordinate point (minimum value in the horizontal direction, and minimum value in the vertical direction), a coordinate point (maximum value in the horizontal direction, and minimum value in the vertical direction), a coordinate point (maximum value in the horizontal direction, and maximum value in the vertical direction), and a coordinate point (minimum value in the horizontal direction, and maximum value in the vertical direction). The rectangle 404 is set as an estimated document area.

A document area correction process includes steps S503 to S505. In step 503, it is determined whether an apex Z (406) farthest from the reading reference position among the apexes of the estimated document area 404 obtained in step S502 is within a range of an area A (407) (a rectangle area on the lower right side in FIG. 4E). The area A (407) is set to have a range of from 202 mm to 212 mm in the horizontal direction and from 283 mm to 293 mm in the vertical direction. The area A (407) has a margin of 10 mm from a horizontal width 212 mm×vertical length 293 mm of the maximum reading area. This margin is based on the presumption that edge extraction may be imperfect because of an influence of noise and a partially omitted edge may be obtained while there is actually an edge of the document. If the apex Z (406) is within the range of the area A (407) (YES in step S503), the process proceeds to step S504. If the apex Z (406) is not within the range of the area A (407) (NO in step S503), the range of the estimated document area 404 is trimmed to be output (step S507).

In the step S504, it is determined whether a width lx (FIG. 4E) of the estimated document area 404 obtained in step S502 is equal to or greater than 202 mm (threshold value X). If the width lx is less than 202 mm (NO in step S504), the process proceeds to step S505. When a letter-size document is set as illustrated in FIG. 3B, as only a bottom edge of the document can be obtained, the document may be trimmed while an upper part of the document is omitted in the case of a conventional method. Therefore, a margin 10 mm from the maximum reading width 212 mm is set to define the threshold value X. If the width lx is equal to or greater than 202 mm (threshold value X) (YES in step S504), it is determined that a letter-size document is set. Then, the process proceeds to step S506.

In step S505, it is determined whether a height ly of the estimated document area 404 obtained in step S502 is equal to or greater than 283 mm (threshold value Y) is determined. If the height ly is equal to or greater than 283 mm (YES in step S505), it is determined that an A4-size document is set. Then, the process proceeds to step S506. If the height ly is less than 283 mm (NO in step S505), the range of the estimated document area 404 is trimmed to be output (S507).

The steps S504 and S505 are carried out to prevent a small document from being erroneously detected to be an A4 or letter size document. Even when the small document is set such that its lower right end is within the area A (407), as a determination is also made based on a size of the estimated document area 404, an erroneous detection can be prevented.

In step S506, a smallest rectangle 405 (FIG. 4D) including an apex on the reading reference position side of the readable range and the apex Z (406) is set as an estimated document area instead of the estimated document area 404 obtained in step S502. Then, the range of the estimated document area 405 is trimmed to be output (step S507).

The size of the area A (407) and the threshold values X and Y for edges are variable. For example, in the case of a document (192 mm×267 mm or more) larger than the B5 size (182 mm×257 mm), step S506 can be carried out. In this case, the area A (407) is set in a range of from 192 mm to 217 mm in the horizontal direction and from 267 mm to 298 mm in the vertical direction, the threshold value X is 182 mm, and the threshold value Y is 257 mm.

If no effective edge is obtained in step S501 due to a small variation in density of a document image, an image corresponding to the entire readable range 305 of the document positioning plate can be output.

An edge detection method applicable to the above-described process includes a Laplacian filter, a Sobel filter, a Roberts filter, and a Prewitt filter.

In the above-described image processing, image data read through the document positioning plate by a scanner is sent to a host PC via a USB interface. In an embodiment, the process illustrated in the flowchart of FIG. 5 is performed by the host PC. The host PC stores the processed image data as a read image on a disk memory.

In the above-described exemplary embodiment, the image processing operation illustrated in the flowchart of FIG. 5 is carried out by the host PC. However, a multifunction peripheral (MFP) equipped with an image processing circuit can perform a process from document reading to image processing and store the processed image as an image file in a memory card inserted into the MFP.

The features of the present invention can be applied to a system which includes a plurality of devices (e.g., a host computer, an interface device, a scanner, a printer, and a multifunction peripheral).

A storage medium (recording medium) storing software program code for realizing the functions of the above-described exemplary embodiments can be supplied to a system or an apparatus. Then, a computer (or a central processing unit (CPU) or a microprocessing unit (MPU)) of the apparatus or system can read and execute the program code stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-205945 filed Jul. 28, 2006, which is hereby incorporated by reference herein in its entirety.

What is claimed is:

1. An image processing apparatus comprising:
   a document positioning plate configured to set a document thereon;
   a reading unit configured to scan and read the document through the document positioning plate by moving a line sensor, which reads lines in a main scanning direction, in a sub-scanning direction to obtain read image data, wherein four edges of a read area of the read image data are parallel either to the main scanning direction or to the sub-scanning direction;
   an image processing circuit configured to process the read image data obtained by the reading unit; and
   an output circuit configured to output the read image data processed by the image processing circuit,
   wherein the image processing circuit extracts an edge area of the read image data obtained by the reading unit and determines a first rectangle area which is a smallest rectangle including all of the extracted edge area, wherein four edges of the first rectangle area are parallel to four respective edges of the read image data,
   wherein the image processing circuit determines whether an apex of the first rectangle area located in a position farthest from a reading reference position is within a predetermined area, wherein the predetermined area is determined based on an apex position of the read image data and an error of extraction of the edge area,
   wherein the image processing circuit compares a length of the first rectangle area in the main scanning direction with a predetermined main scanning length, and compares a length of the first rectangle area in the sub-scanning direction with a predetermined sub-scanning length, wherein the predetermined main scanning length and the predetermined sub-scanning length are determined based on a size of the read image data and the error of extraction of the edge area,
   wherein the output circuit outputs the document image data corresponding to a second rectangle area including the first rectangle area and the reading reference position among the read image data in a first case where it is determined that the apex is within the predetermined area and it is determined that the length of the first rectangle area in the main scanning direction is equal to or greater than the predetermined main scanning length or where it is determined that the apex is within the predetermined area and it is determined that the length of the first rectangle area in the sub-scanning direction is equal to or greater than the predetermined sub-scanning length.

2. The image processing apparatus according to claim 1, wherein the output circuit outputs the document image data corresponding to the first rectangular area in a case where it is determined that the apex of the first rectangle area located in a position farthest from the reading reference position is not within the predetermined area.

3. The image processing apparatus according to claim 1, wherein the output circuit outputs the document image data corresponding to the first rectangular area in a case where it is determined that the length of the first rectangle area in the main scanning direction is less than the predetermined main scanning length and where it is determined that the length of the first rectangle in the sub-scanning direction is less than the predetermined sub-scanning.

4. A method for reading a document set on a document positioning plate to output document image data, the method comprising:
   reading the document through the document positioning plate by moving a line sensor, which reads lines in a main scanning direction, in a sub-scanning direction to obtain read image data, wherein four edges of a read area of the read image data are parallel either to the main scanning direction or to the sub-scanning direction;
   extracting an edge area of the read image data;
   determining a first rectangle area which is a smallest rectangle including all of the extracted edge area, wherein four edges of the first rectangle area are parallel to four respective edges of the read image data;
   determining whether an apex of the first rectangle area located in a position farthest from a reading reference position is within a predetermined area wherein the predetermined area is determined based on an apex position of the read image data and an error of extraction of the edge area;
   comparing a length of the first rectangle area in the main scanning direction with a predetermined main scanning length;
   comparing a length of the first rectangle area in the sub-scanning direction with a predetermined sub-scanning length, wherein the predetermined main scanning length and the predetermined sub-scanning length are determined based on a size of the read image data and the error of extraction of the edge area;
   outputting the document image data corresponding to a second rectangle area including the first rectangle area and the reading reference position among the read image data in a first case where it is determined that the apex is within the predetermined area and it is determined that the length of the first rectangle area in the main scanning direction is equal to or greater than the predetermined main scanning length or where it is determined that the apex is within the predetermined area and it is determined that the length of the first rectangle area in the sub-scanning direction is equal to or greater than the predetermined sub-scanning length; and outputting the document image data corresponding to the first rectangle area in a second case other than the first case.

5. The method according to claim 4, further comprising applying one of a Laplacian filter, a Sobel filter, a Roberts filter, and a Prewitt filter to the read image data to extract the edge area.

6. The method according to claim 4, further comprising outputting image data corresponding to the read image data in a case where no effective edge is obtained in extracting the edge area.

7. The method according to claim 4, wherein the predetermined area is determined based on an apex position of a standard-size document and an error of extraction of the edge area.

8. The method according to claim 4, wherein the predetermined main scanning length and the predetermined sub-scanning length are determined based on a size of a standard-size document and an error of extraction of the edge area.

* * * * *